United States Patent
Eveleth

[11] 3,851,951
[45] Dec. 3, 1974

[54] HIGH RESOLUTION LASER BEAM RECORDER WITH SELF-FOCUSING ACOUSTO-OPTIC SCANNER

[75] Inventor: Jason H. Eveleth, Mountain Lakes, N.J.

[73] Assignee: Isomet Corporation, Oakland, N.J.

[22] Filed: Jan. 16, 1974

[21] Appl. No.: 433,699

[52] U.S. Cl. .................................. 350/161, 178/7.6
[51] Int. Cl. ............................................... G02f 1/28
[58] Field of Search .............. 350/161; 178/7.3, 7.5, 178/7.6

[56] References Cited
UNITED STATES PATENTS

| | | | |
|---|---|---|---|
| 3,531,184 | 9/1970 | Adler | 350/161 |
| 3,545,841 | 12/1970 | Dentino et al. | 350/161 |

*Primary Examiner*—Ronald L. Wibert
*Assistant Examiner*—Paul K. Godwin
*Attorney, Agent, or Firm*—Shapiro and Shapiro

[57] ABSTRACT

Laser beam recording and playback system in which light is focused upon an image plane by interaction with frequency modulated acoustic pulses in a Bragg cell and is scanned across the image plane in accordance with the movement of the pulses along the cell. The light incident upon the cell may be caused to track the movement of the acoustic pulses by employing a preliminary Bragg deflector, which may also serve to intensity modulate the light for recording intelligence upon a photosensitive medium at the image plane. In playback, a photo-sensor responds to the variations in density of a pre-recorded medium scanned by the focused beam.

16 Claims, 4 Drawing Figures

HIGH RESOLUTION LASER BEAM RECORDER WITH SELF-FOCUSING ACOUSTO-OPTIC SCANNER

BACKGROUND OF THE INVENTION

This invention relates to an optical recording and playback system, apparatus, and method and is more particularly concerned with an improved acousto-optic scanner.

Optical recorders for recording digital or analog signals or images on photo-sensitive materials such as photographic film have several characteristics which are superior to magnetic recording. For example, information can be recorded with higher densities and at greater speeds on film than upon magnetic tape. Tape recorders do not produce directly observable images and are large, heavy and expensive.

Laser beam recorders can write on film with extremely high information densities and at very high speeds because (1) laser beams can be focused to very small diameters, (2) laser beams can generate enormous light intensities when focused to a point, and (3) photographic film is very sensitive to light and thus the exposure time for a particular position on the film can be made very short. Laser beam recorders are finding applications in computer output-to-microfilm equipment, video recorders for radar, television recorders, and other applications.

Most laser recorders developed to date have utilized high speed mechanical mirror scanning to move the focused beam across the film in the X direction and a film transport to move the film in the Y direction. Scanning inaccuracies result from inaccuracies in mirror fabrication, distortions due to the motion of the mirrors and variations due to the drive mechanisms. In addition, mechanical failures and acoustic noise generation have been problems.

Attempts have been made to substitute solid-state scanners which utilize interaction of light with ultrasonic waves. The theory and application of such devices is well documented in the literature. See, for example, *Applied Optics*, Vol. 5, October, 1966, pp. 1,629–1,638; *IEEE Spectrum*, May, 1967, pp. 42–54; *Proceedings of the IEEE*, Vol. 54, No. 10, October, 1966, pp. 1,429–1,437. Solid-state scanners employing Bragg diffraction cells or the like are well known. In addition to the foregoing publications, see, for example U.S. Pat. Nos. 3,055,258; 3,531,184; 3,516,729; 3,514,534; and 3,590,157. In such devices the angle of light deflection varies in accordance with the frequency of the acoustic energy in the cell. Usually the duration of each frequency sweep of the acoustic energy is long compared to the transit time for acoustic energy traveling the length of the cell, but the frequency of the acoustic energy at one end of the cell still differs from that at the other end of the cell, causing slightly different light deflection angles. To overcome this problem it has been proposed to employ optical or other compensation. Solid-state acousto-optic video display systems are also known in which time-domain-to-frequency-domain transform is employed for developing image elements at positions in an image plane as a function of frequency. See, for example, U.S. Pat. Nos. 3,488,437 and 3,545,841.

It has previously been proposed, as in U.S. Pat. No. 2,158,990, to provide optical scanning by varying the position of the interaction of optical and acoustic energy along an interaction medium. Such devices have not been self-focusing, however, and have required elaborate additional optical systems for focusing the light to a spot in an image plane. It has also been proposed, as disclosed in *Applied Optics*, Vol. 9, No. 9, September, 1970, pp. 2,154–2,160, to provide a traveling-wave refracting acoustic lens. Such a system employs an additional deflection cell for tracking of the laser light with the moving lens and is a resolution "multiplying" system. For recording purposes it has been necessary to employ a separate light modulator.

It has been proposed, further, to provide wideband pulse compression via Brillouin scattering in the Bragg limit. See *Proceedings of the IEEE*, Vol. 55, No. 9, September, 1967, pp. 1,602–1,612. This pulse compression system employs a focusing mechanism whereby light scattered from all parts of a frequency-swept acoustic pulse in an acousto-optic interaction medium is directed to a spot in a focal plane. A narrow slit at a discrete position in the focal plane passes a time-compressed light pulse when the spot traverses that position.

BRIEF DESCRIPTION OF THE INVENTION

Despite the proliferation of acousto-optic devices in the prior art, as evidenced by the foregoing citations, a need has remained for an improved solid-state optical scanner which yields performance superior to that of mechanical scanners and yet does not suffer from some of the limitations of previous solid-state scanners. It is a principal object of the present invention to provide such a device.

A further object of the invention is to provide improved optical recording and playback systems, methods, apparatus, and devices and improved optical scanners which are simpler, more efficient, more accurate, and more versatile than those known heretofore and which have better resolution, linearity and stability.

Briefly stated, a preferred form of the invention employs a solid-state Bragg cell device in which simultaneous scanning and focusing are accomplished acoustically. The focusing is produced by diffraction from frequency-modulated acoustic pulses, and the scanning speed is set by the velocity of the pulses in the acousto-optic interaction medium. A preliminary Bragg device is employed to optimize utlization of light from a laser source, by causing the light to track the acoustic pulses propagated in the scanner, and to intensity modulate the light for recording.

BRIEF DESCRIPTION OF THE DRAWINGS

The invention will be further described in conjunction with the accompanying drawings, while illustrate preferred and exemplary embodiments, and wherein.

DETAILED DESCRIPTION OF THE INVENTION

Figure 1:
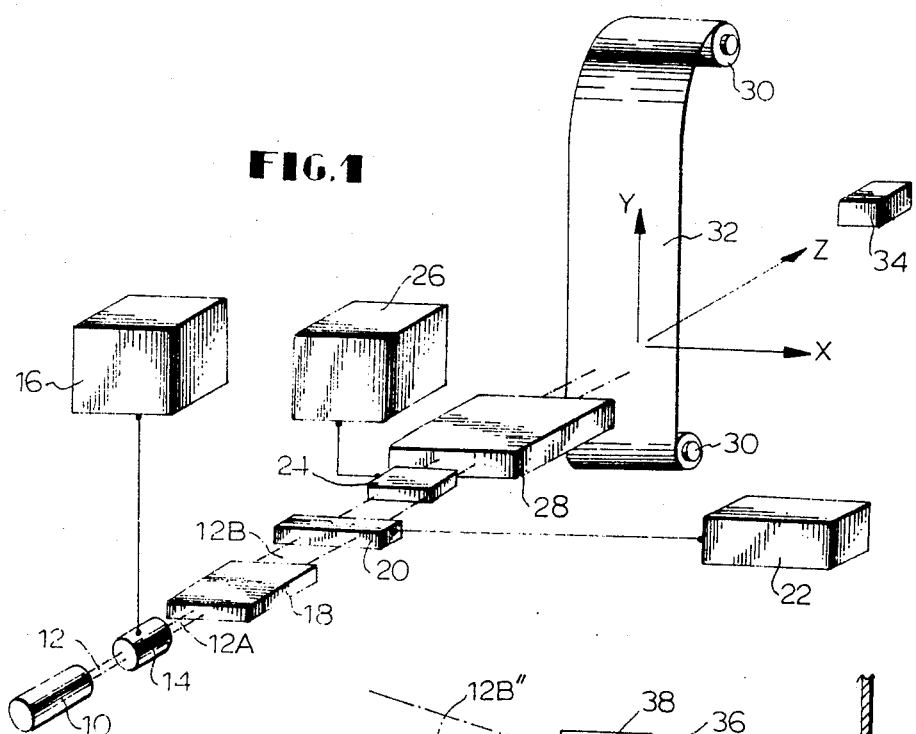
FIG. 1 is a digrammatic perspective view of a recording and playback system in accordance with the invention.

Referring to the drawings, FIG. 1 illustrates a recording and playback system of the invention comprising a laser 10 which produces a laser beam 12, a modulator-deflector 14, a modulator-deflector driver 16, a beam expander 18, an X-axis scanner 20 (which will also be referred to as the horizontal scanner) and scanner electronics 22. The system also comprises a Y-axis deflector 24 (which will also be referred to as the vertical deflector), a deflector driver 26, a beam contractor and focusing optics 28, a film transport 30, photographic film 32, and a photodetector 34.

Laser 10 may be a HeCd or HeNe laser, for example. The modulator-deflector 14, which will be described more fully hereinafter, intensity modulates the laser beam (during recording) and also serves to deflect the laser beam along the X-axis for more efficient utilization of the laser light in scanner 20, as will be later described. The modulated and deflected beam 12A is expanded along the X-axis by the beam expander 18, as shown at 12B. The beam expander may comprise a Cassegranian telescope with a Maksutof corrector lens. Suitable beam expanders are well known in the art.

The X-aris scanner 20 focuses the beam horizontally and sweeps the beam along the X-axis in a manner which will be described later in detail. The vertical deflector 24 is employed to provide scanning in the Y direction and may be a conventional Bragg deflector, for example. If desired, the vertical deflector can be eliminated, and vertical deflection can be provided by operation of the film transport 30. The scanning beam is focused vertically by the focusing optics 28, which may comprise conventional lenses and a zero order beam stop which prevents transmission of undesired light to the film 32.

As will become fully apparent, a two-dimensional image may be recorded upon the photographic film 32 in accordance with the focused, scanned and intensity-modulated laser beam. Pre-recorded film may be played back by scanning the film with the focused laser beam of constant intensity and sensing the density variations of the film with the photo-detector 34.

Figure 3:
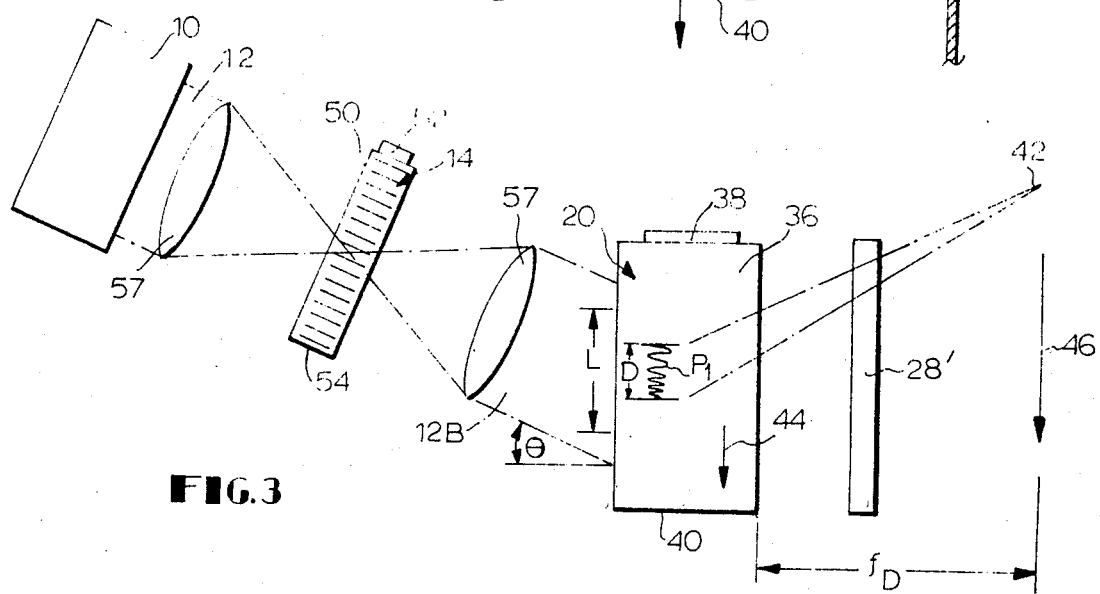
FIG. 3 is a diagrammatic elevation view illustrating the operation of the invention.

FIG. 3 illustrates the X-axis scanner 20, and the manner in which it operates. The scanner is an acousto-optic Bragg cell device comprising a rectangular bar 36 of photoelastic material such as a single tellurium dioxide ($TeO_2$) crystal, at one end of which an electro-acoustic transducer 38 (such as lithium niobate) is secured conventionally and at the other end of which an acoustic absorber 40 is secured conventionally. If the cell is $TeO_2$ oriented such that the sound wave travels down [110] direction, and the sound is shear wave with displacement along [$\bar{1}$10], the sound velocity is 0.617 mm/$\mu$sec. along the X-axis. The acoustic energy is introduced as frequency modulated (chirp) pulses. Each pulse has a linear frequency variation from the leading edge to the trailing edge, with the frequency being higher at the leading edge in the form shown.

In FIG. 3, an acoustic pulse P1 of length D is shown illuminated by the light beam 12B (the light traveling approximately down the optic axis [001] of the crystal). In this initial description of the scanner, the beam expander is shown as a pair of lenses 57 and the deflection function of modulator 14 is not employed (beam width being large relative to D).

Acousto-optic interaction occurring in the region of the FM pulse P1 results in a focused beam of light, producing a spot of light at point 42. The focusing effect in the plane of the figure is caused by the frequency distribution in the pulse which diffracts the light at larger angles at the high frequency end of the pulse than at the low frequency end. The angle $\theta$ of the light beam 12A, the velocity of propagation v of the acoustic pulses in the bar, the wavelength $\lambda$ of the laser light, the frequency $f$ of the sound waves and the acoustic power $Pa$ in the sound beam are chosen to maximize the amount of light which is diffracted in the direction of point 42. The angle $\theta$ is set to satisfy the Bragg condition in the medium of bar 36 at the center frequency of the FM pulse.

As the pulse P1 travels down the cell in the direction of arrow 44, the point at which light is focused will also move parallel to the sound wave direction, as shown by arrow 46. A conventional cylindrical lens 28' focuses the spot in the plane perpendicular to the plane of FIG. 3 and conventional optics of beam contractor 28 may also be employed to contract the image.

It is apparent that focusing in the horizontal plane is produced acoustically by Bragg diffraction from the acoustic pulses, and scanning in the X direction is produced by movement of the pulses in the X direction. The scanning speed is determined by the velocity of the acoustic pulses in the X direction.

The total traverse of the focal point 42 along the X-axis will be L, which, ignoring $\theta$, is equal to beam width 12B minus D. The useful time for the traverse of the acoustic pulse across the laser beam is $\tau$ which is equal to $L/v$. The resolution N of an acousto-optic Bragg deflector is $N = \Delta f \tau$, in which $\Delta f$ is the bandwidth of the chirp pulse. Since N spots are recorded in a time duration $\tau$, the recording rate is $\Delta f$. An FM pulse may be injected into the Bragg cell every period of time $\tau$. Thus, if film is placed at the focal distance $f_D$ and moves in a direction perpendicular to the plane of FIG. 3, a new line of information can be written every period $\tau$.

Figure 4:
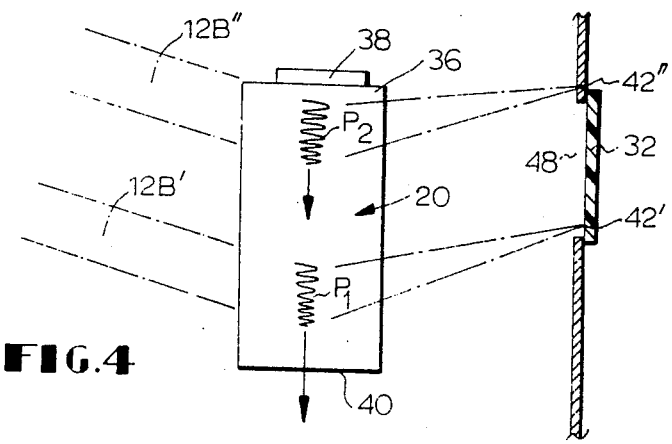
FIG. 4 is a further diagrammatic elevation view illustrating the operation of the invention.

In most scanners employing Bragg cells, flyback time is a significant limitation. During this time no information can be recorded. In addition, the resolution of such systems is reduced by the ratio of the flyback time to the scan period. In accordance with the present invention, on the other hand, flyback time can be substantially eliminated by supplying the acoustic pulses at a rate such that a focused spot just enters the image aperture as the preceding spot leaves the image aperture. This is shown in FIG. 4 wherein the film 32 (extending perpendicular to the plane of the figure) is exposed through the image aperture 48 at the image plane. Aperture 48 has a dimension along the X-axis that is many times greater than the corresponding spot dimension, so as to accommodate 1,000 spots along a scan line, for example. Light from spot 42' focused by pulse P1 is just leaving the aperture 48 and light from spot 42" focused by pulse P2 is just entering the aperture. In order to avoid undesired variations in light intensity and resolution, each FM pulse should be substantially completely and uniformly illuminated by the incident light as long as the spot focused by that pulse is in the image aperture. Thus, pulse P1 should be fully illuminated by incident light until spot 42' leaves the image aperture, and pulse P2 should be fully illuminated at the time that spot 42" enters the aperture. Pulses P1 and P2 considered together may substantially fill the useful length of the bar 36 and may be contiguous. The length D of each pulse should not exceed half the useful length of the bar but maay be substantially shorter (say 1/10 the useful length of the bar).

In prior Bragg cell scanners the motion of the beam in space results from variation of the frequency of the acoustic energy. Previous scanning arrangements have required that the optical aperture of the bar be filled with the optical beam and the sound beam during scanning. The Bragg cell material thus had to be optically uniform from end to end to avoid blurring of the focused spot. The acoustic signal also had to be accurately generated over long scanning periods. In the present invention optical uniformity must be preserved only over any distance D, and the accuracy of the acoustic signal characteristics is reduced by L/D, which can be a factor of 10. Previous arrangements have relied on electronically generated scanning speeds (scanning speed being determined by the rate at which acoustic frequency is varied), which leads to complex wave form generation circuits. In the present invention a simple passive chirp filter can be utlized. Also, since the entire bandwidth of the cell is used at all times, loss of efficiency at the scan edges, which is common in previous arrangements, is avoided. Since in the invention the light spot is scanned by the propagation of an acoustic pulse within a crystal, a very linear and reproduceable scan is achieved. This preserves the absolute frequency of the recorded signal during both recording and playback since the velocity of propagation of the acoustic signal is constant.

More efficient utilization of laser light may be attained by employing an incident light beam 12B having a cross-dimension along the length of each acoustic pulse that is substantially equal to the length of the pulse and by causing the incident beam to track the pulse, rather than employing a wide beam as in FIG. 3. Thus in FIG. 4, two positions 12B' and 12B'' of a narrower incident beam are illustrated, for illumination of successive pulses P1 and P2, respectively. As the spot 42' from pulse P1 starts to leave the aperture 48, the incident beam should immediately switch from position 12B' to position 12B'', so as to illuminate pulse P2 when spot 42'' is about to enter the aperture. The incident beam will then track the pulse until the spot from that pulse starts to leave the aperture, whereupon the beam will again switch to alignment with the next pulse. Modulator-deflector 14 can perform this function in addition to the intensity-modulation function previously described.

As shown in FIG. 3, the modulator-deflector 14 may be a Bragg cell device comprising a rectangular bar 50 of photoelastic material (e.g., $TeO_2$) with an electroacoustic transducer 52 (e.g., lithium niobate) at one end and an acoustic absorber 54 at the opposite end. Device 14 operates as a low resolution (two or more resolution elements) Bragg deflector by varying the frequency of the acoustic energy in bar 50 so as to vary the deflection of the light beam applied to the scanner 20, thereby causing the light beam 12B to track the acoustic pulses of the scanner 20. Acoustic waves propagating away from flat, thickness-mode piezoelectric transducer 52 into the interaction medium 50 form a phase grating of almost planar wave fronts. Light rays passing through the crystal 50 approximately parallel to the acoustic wave fronts are diffracted by the phase grating. If the light strikes the acoustic wave fronts at the proper angle for Bragg diffraction, the light appears to be reflected from the wave fronts. By varying the frequency of the drive signal, the angle at which the light leaves the cell will vary. The intensity of the light beam is varied by modulating the amplitude of the acoustic energy supplied to bar 50, as described, for example, in the *Journal of Quantum Electronics*, Vol, QE-6, No. 1, January 1970, pp. 15-24.

Figure 2:
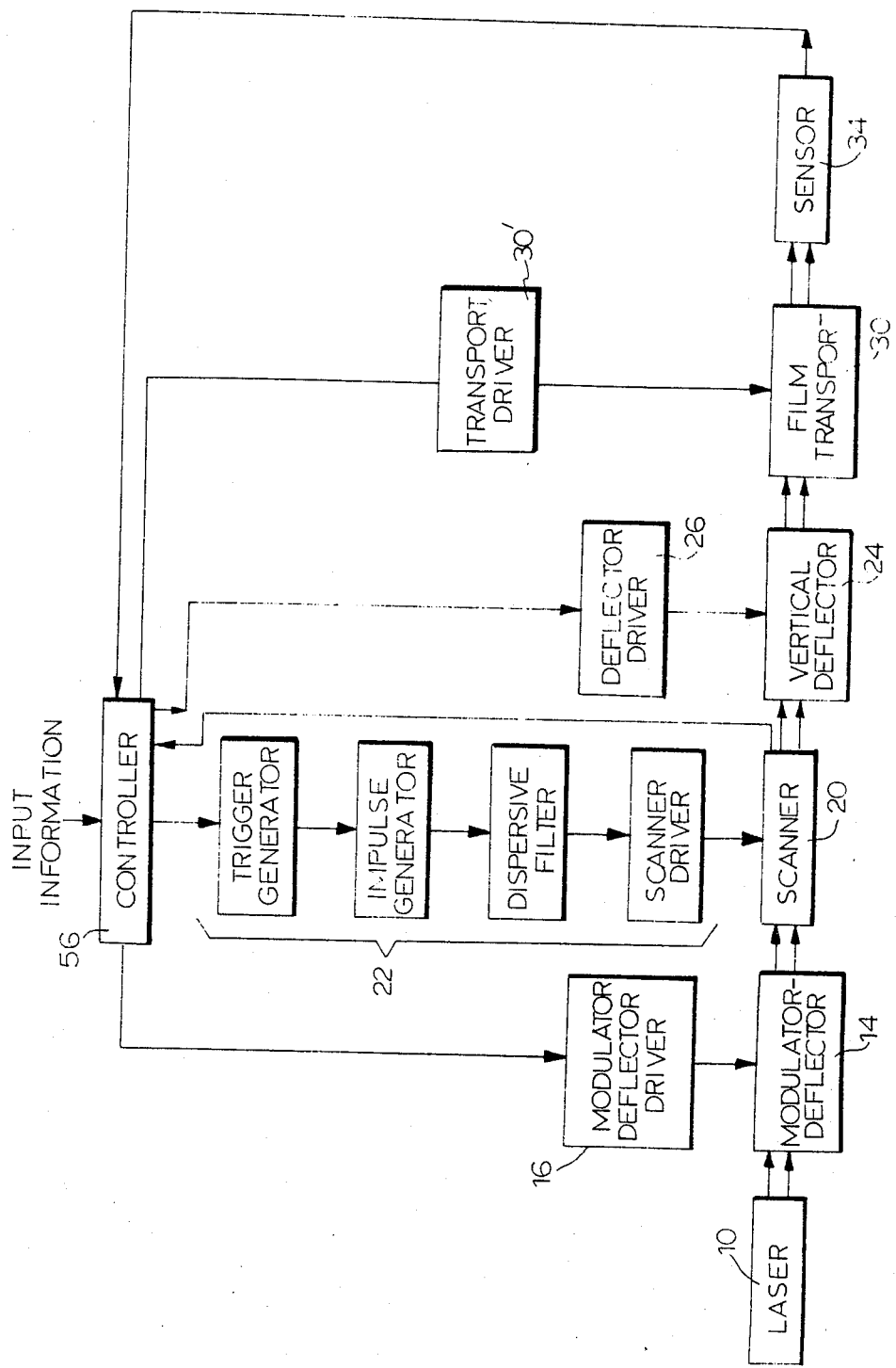
FIG. 2 is a simplified block diagram of a system of the invention.

FIG. 2 illustrates in block diagram form principal portions of the system of FIG. 1 and further illustrates some of the electronics. The modulator-deflector 14 may be a standard high frequency modulator manufactured by Isomet Corporation of Oakland, N.J. In order to track the chirp pulse, an angular change of typically 15 mr may be used corresponding typically to a frequency change of 100 MHz. The modulator-deflector transducer must also be able to handle the modulation frequencies produced. A modulation bandwith of 20 MHz, for example, will necessitate an RF bandwidth of 40 MHz. Thus, a total RF bandwidth of 140 MHz would be required. Since the fractional bandwidth of the transducer is 0.5, the center frequency of the modulator-deflector would be 280 MHz.

The modulator-deflector driver 16 may contain a voltage-controlled oscillator which is driven by a linear voltage ramp. To ensure synchronization with the FM(chirp) pulses of the scanner 20, driver 16 and scanner electronics 22 are both driven from the same controller 56. Since the amplitude of the deflected beam from modulator-deflector 14 is proportional to the amplitude of the acoustic signal applied to the modulator-deflector, modulation of the laser beam is accomplished by amplitude modulating the RF signal applied to the transducer of the modulator-deflector 14. A double balanced mixer may be employed for this purpose.

As shown in FIG. 2, the electronics 22 for scanner 20 may include a trigger generator, an impulse generator, a dispersive filter, and a scanner amplifier. The chirp pulse may be generated in a conventional manner, as by applying an impulse function to a dispersive surface-wave acoustic delay line or filter, which may be of the reflective array compressor (RAC) type. The delay line is comprised of a piezoelectric substrate, an inter-digital transmitter array, a set of herringbone grooves etched into the substrate surface and an inter-digital receiver array. An impulse applied to the transmitter array generates surface waves that are reflected from the herringbone grooves to the receiving array. The grooves are frequency selective and spaced in such a manner that each frequency component of the impulse must travel a slightly greater distance than the next higher component. This produces a down-chirp output signal that has an extremely linear frequency variation. The frequency dispersion is soley determined by the spacing of the grooves and hence is not affected by minor variations in the characteristics of the impulse. The output pulse is clipped to produce a constant amplitude and gated to an appropriate width, for example, 31.29 $\mu$ s. If this is done at the center frequency of the scanner, such as 42 MHz, a problem with harmonics may arise, since the chirp pulse may cover the frequency range of 27 MHz to 57 MHz. To avoid this problem, the chirp pulses may be generated around a center frequency of 80 MHz and translated down to 42 MHz by means of a crystal controlled oscillator. This permits the pulse to be filtered after clipping to eliminate harmonics. It is convenient to use a scanner center frequency of 42 MHz, because this frequency is close to the frequency at which HeNe laser light is diffracted at right angles to the sound column. such diffraction may minimize focused spot distortion.

The vertical deflector may have the same overall dimensions as the horizontal scanner but differ therefrom in that the transducer is on a long edge rather than the small end of the crystal. The film transport may be driven from a conventional driver 30', which may operate intermittently or continuously. To provide synchronization, both the vertical deflection driver 25 and the film transport driver 30' may be triggered by controller 56. Controller 56 illustrates diagrmmatically conventional circuits for providing the usual timing signals, for supplying input information to the modulator-deflector and for reading out information from the playback sensor 34.

The recorder of the present invention has an inherently high resolution (approximately 1,000 spots, for example) and wide limiting bandwidth (20 MHz, for example), as well as zero flyback time (essentially equal to the rise time of the drive signal of the modulator-deflector). The recorder may be employed to record information on 8 mm. photographic, or electrophotographic film, for example, of which 5 mm. can be used for recording. For 1,000 spots per scan, the spot size on the film is $5\mu m$, resolution easily met with most types of film. If 1,000 spots are recorded at a 20 MHz rate, and the scan period is 30 $\mu sec$, the performance of the system corresponds closely to that required for the recording of 875 line television. Since the 5 mm image must be formed in about 30 $\mu sec$, the acoustic velocity in the X-axis scanner should be rather low. Ideally, it may be 0.17 mm per $\mu sec$, but a larger value can be tolerated if suitable beam contracting optics are used. With shear wave propagation down the [110] direction of $TeO_2$ single crystal at a velocity of 0.617 mm/$\mu sec$, the contracting optics must reduce the image size in the X direction by a factor of about 4.

Typically, the time-bandwidth product of the scanner may be 939, composed of a bandwidth of 30 MHz and a transit time of 31.09 $\mu sec$. The crystal of the X-axis scanner may be at least 45 mm. long, so that its aperture cannot limit performance and so that long FM pulses can be accommodated. The width of the crystal in the Y direction may be 15 mm and the thickness in the Z direction 8 mm.

Since the X-axis scanner 20 is more efficient with circularly polarized light, a quarter-wave plate may be inserted between the laser 10 and the scanner 20 to convert the light from linear to right-hand circular polarization. A half-wave plate between the scanner 20 and the vertical deflector 24 would then reverse the polarity of the scanned light. This is necessary because the scanner 20 converts the right-hand circular polarization to left-hand, and if an acousto-optic Y-axis deflector is used, right-handed light is needed. If images are being recorded, the input to the modulator-deflector 14 should be video. If the recorder is used as a signal recorder, it is desirable to use FM modulation to reduce the complexity of correcting the amplitude non-linearities in the system.

The invention may be employed to form motion pictures from television signals, for example, or may be employed as a computer output-to-microfilm device or vice versa. Scanning systems employing the present invention can also be used in optical memories, fascimile machines, copiers, typesetters, displays and other applications.

While preferred forms of the invention have been shown and described, it will be apparent to those skilled in the art that changes can be made in these forms without departing from the principles and spirit of the invention, the scope of which is defined in the appended claims.

The invention claimed is:

1. An optical scanner system comprising an acousto-optic diffraction cell, means for introducing acoustic pulses to said cell for travel along the cell, each pulse having a band of acoustic frequencies which vary between the leading end of the pulse and the trailing end of the pulse, means for applying a beam of light to said cell at an angle for diffraction from each pulse, whereby light is focused by diffraction from each pulse to a spot in an image plane, and means providing an image aperture at said image plane across which each spot is scanned in accordance with the movement of the corresponding pulse along said cell, the dimension of said image aperture along the scanning direction of each spot being very large compared to the corresponding dimension of the spot.

2. A system in accordance with claim 1, wherein the length of each pulse along the travel direction in said cell is substantially equal to or less than half the length of the cell along that direction.

3. A system in accordance with claim 1, wherein said means for introducing said acoustic pulses to said cell includes means for timing said pulses such that as the spot focused from a pulse in the cell leaves the image aperture another spot focused from a succeeding pulse in the cell enters the aperture.

4. A system in accordance with claim 1, wherein said means for applying a light beam to said cell includes means for modulating said light beam.

5. A system in accordance with claim 1, wherein said light beam applied to said cell has a cross-dimension along the direction of travel of said pulses approximately equal to the length of each acoustic pulse and said light beam applying means includes means for tracking each acoustic pulse with said light beam.

6. A system in accordance with claim 5, wherein said tracking means includes means for modulating said light beam.

7. A system in accordance with claim 6, wherein said tracking means comprises an acousto-optic interaction cell which deflects light at an angle depending upon the frequency of the acoustic energy in the cell and which varies the intensity of the deflected light in accordance with the amplitude of the acoustic energy and means for varying the frequency and amplitude of such energy.

8. A system in accordance with claim 7, wherein said tracking means is a Bragg diffraction cell.

9. A system in accordance with claim 1, further comprising a recording medium at said image plane, and means for causing each spot to define a corresponding scan line on said medium, with the scan lines spaced transversely.

10. a system in accordance with claim 9, further comprising means for intensity-modulating said light beam.

11. A system in accordance with claim 1, wherein said cell has a tellurium dioxide acousto-optic interaction medium and wherein said means for introducing said pulses comprises a shear wave propagating transducer.

12. An acousto-optic light scanning method, which comprises introducing to an acousto-optic interaction medium an acoustic pulse which varies in frequency along its length, applying a light beam to said pulse in said medium, focusing said light beam to a spot in an image plane by diffraction from said pulse, providing an image aperture at said plane having a width many times the corresponding dimension of said spot, and propagating said pulse in said medium whereby the spot is caused to move across said aperture along said width.

13. A method in accordance with claim 12, wherein a second pulse is introduced to said medium and substantially fully exposed to said light beam for focusing light to a second spot which enters said aperture as the first-mentioned spot leaves said aperture.

14. A method in accordance with claim 12, wherein said light beam has a cross-dimension substantially equal to the length of said pulse and wherein said beam is moved along said medium so as to track the movement of said pulse.

15. A method in accordance with claim 14, wherein said beam is modulated before said pulse is exposed thereto.

16. A method in accordance with claim 12, wherein said beam is modulated.

* * * * *